US008209220B2

(12) United States Patent      (10) Patent No.: US 8,209,220 B2
Mohammed et al.      (45) Date of Patent: Jun. 26, 2012

(54) ONLINE SERVICES OFFER MANAGEMENT

(75) Inventors: Yunus Mohammed, Bellevue, WA (US); Christopher J. Gariepy, Bothell, WA (US); Apurva F. Dalia, Sammamish, WA (US); Venugopala Rao Moram, Redmond, WA (US); Joydeep Bhattacharyya, Bellevue, WA (US); Sandeep P. Karanth, Bangalore (IN); Christopher J. Saam, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 349 days.

(21) Appl. No.: 12/163,834

(22) Filed: Jun. 27, 2008

(65) Prior Publication Data

US 2009/0327063 A1     Dec. 31, 2009

(51) Int. Cl.
*G06Q 30/00*     (2012.01)
*G06Q 20/00*     (2012.01)
*G06F 9/46*     (2006.01)
*G06F 9/44*     (2006.01)

(52) U.S. Cl. ............ 705/14.1; 705/26.4; 705/26.5; 705/64; 718/104; 717/168

(58) Field of Classification Search .......... 705/14.1, 705/26.4, 26.5
See application file for complete search history.

(56) References Cited

U.S. PATENT DOCUMENTS

| | | | |
|---|---|---|---|
| 6,269,343 B1 | 7/2001 | Pallakoff | 705/26 |
| 6,415,262 B1 | 7/2002 | Walker et al. | 705/14 |
| 6,574,606 B1 | 6/2003 | Bell et al. | 705/14 |
| 6,934,690 B1 | 8/2005 | Van Horn et al. | 705/26 |
| 7,092,892 B1 | 8/2006 | Sobalvarro et al. | 707/5 |
| 7,139,725 B1 | 11/2006 | Moyerson | 705/14 |
| 7,158,943 B2 | 1/2007 | van der Riet | 705/14 |
| 7,184,970 B1 | 2/2007 | Squillante | 705/14 |
| 7,263,505 B1 | 8/2007 | Forlai | 705/37 |
| 2002/0052778 A1 | 5/2002 | Murphy et al. | 705/14 |
| 2004/0068481 A1* | 4/2004 | Seshadri et al. | 707/1 |
| 2005/0002335 A1* | 1/2005 | Adamczyk et al. | 370/230 |
| 2006/0059107 A1* | 3/2006 | Elmore et al. | 705/64 |
| 2007/0297350 A1* | 12/2007 | Eilam et al. | 370/255 |
| 2008/0046883 A1* | 2/2008 | Gautney | 717/176 |
| 2008/0052719 A1* | 2/2008 | Briscoe et al. | 718/104 |
| 2008/0120174 A1* | 5/2008 | Li | 705/14 |
| 2008/0208786 A1* | 8/2008 | Serrano-Morales et al. | 706/47 |

OTHER PUBLICATIONS

S. Arroyo et al., "Web Service Capabilities and Constraints in WSMO," http://www.w3.org/2004/08/ws-cc/wsmo-20040903, Aug. 31, 2004, pp. 1-5.
"4 Reasons Why Web Designers Should Offer Email Marketing as a Service," http://www.mailbuild.com/resources/why-offer-email.aspx, 2 pgs.
"Vantis Launches 'Package Select' Dynamic Online Booking Engine," http://www.hotel-online.com/News/PR2004_4th/Nov04_VantisDeerhurst.html, Nov. 23, 2004, 4 pgs.
"Ecommerce System with Online Store, Shopping Cart & Inventory System:," http://www.iventa.com/Ecommerce-System.aspx, Copyright 1999-2007 Inventa Corporation, 4 pgs.

* cited by examiner

*Primary Examiner* — Gregory Johnson
(74) *Attorney, Agent, or Firm* — Merchant & Gould (57) ABSTRACT

Online services offer modeling is provided. A system for managing online offers for products and services includes a components module, an offer module, a subscription module, a billing module and a change management module. The component module defines the properties of components that may be included in an offer. The offer module defines the features of the offer, including one or more components. The components may be a base component or an add-on component. The subscription module processes the provisioning of an offer. The market module specifies countries or regions in which offers are made available. The billing module processes billing and payment actions for an offer. The change management module processes alterations to a provisioned offer, inserting the properties of an add-on component into the properties of a base component.

20 Claims, 7 Drawing Sheets

310
```
<Properties>
<Name type='base' Component='Website' ComponentInstance='1235'>www.websitedomain.com</Name>   312
<Storage type='base' Component='Website' ComponentInstance='12345'>1000</Storage>
<Bandwidth type='base' Component='Website' ComponentInstance='12345'>2500</Bandwidth>   314
</Properties>
```

320
```
<Properties>   322
<Storage type='add-on' Component='2GWSStorage' ComponentInstance='67890'>2000</Storage>   324
</Properties>
```

330
```
<Properties>
<Name type='base' Component='Website' ComponentInstance='1235'>www.websitedomain.com</Name>   332
<Storage type='base' Component='Website' ComponentInstance='12345'>1000</Storage>   334
<Bandwidth type='base' Component='Website' ComponentInstance='12345'>2500</Bandwidth>
<Storage type='add-on' Component='2GWSStorage' ComponentInstance='67890'>2000</Storage>   336
</Properties>
```

410
```
<Properties>
<Name type='base' Component='Website' ComponentInstance='1235'>www.websitedomain.com</Name>
<Storage type='base' Component='Website' ComponentInstance='12345'>1500</Storage>
<Bandwidth type='base' Component='Website' ComponentInstance='12345'>2500</Bandwidth>
<Storage type='add-on' Component='2GWSStorage' ComponentInstance='67890'>2000</Storage>
</Properties>
```
412
414

420
```
<Properties>
<Name type='base' Component='Website' ComponentInstance='1235'>www.websitedomain.com</Name>
<Storage type='base' Component='Website' ComponentInstance='12345'>1500</Storage>
<Bandwidth type='base' Component='Website' ComponentInstance='12345'>2500</Bandwidth>
</Properties>
```

ONLINE SERVICES OFFER MANAGEMENT

BACKGROUND

With the pervasiveness of the Internet, it is common to make product offers available to customers online. Offers are often put together in packages that include multiple components. In many cases, a customer buying a package may be required to buy features that the customer does not require or want.

Because online customers may access the Internet from anywhere in the world, product offerings often need to be tailored to specific geographical areas and markets. Billing also needs to be tailored to specific markets to handle differences in currency and payment requirements.

SUMMARY

The present disclosure relates to a system and methods for providing online offers for products, applications and services. An offer is a collection of components which provide the products, applications and services. Offers may be purchased by customers or they may be accepted free of charge. The systems and methods provide a model that supports base and add-on offer components, properties of components, provisioning, reprovisioning and deprovisioning of components, renaming, resetting, enabling and disabling of components, just-in-time provisioning and change management.

According to one embodiment, a system for managing online offers includes a components module, an offer module, a subscription module, a market module, a billing module and a change management module. The components module includes one or more components that may be included in an offer. Each component includes properties that define the capabilities of the component. A component may either be a base component that is included in a base offer or an add-on component that is included in a reprovisioned offer.

The offer module defines the features of the offer, the offer including one or more components. The subscription module processes the provisioning of an offer. The market module specifies countries or billing regions in which offers are made available. The billing module processes billing and payment actions for an offer. The change management module processes alterations to a processed offer, inserting the properties of an add-on component into the properties of a base component.

According to another embodiment, a method for managing online offers for products and services is provided. An offer for a product or service is made available to the public online. The offer is made available in one or more markets. When an indication is received that a user has accepted the offer, the offer is provisioned into a subscription. When a request is received to add features to the offer, the components that can implement the features are identified. The subscription is then reprovisioned by inserting the properties of the identified components into the properties of the base components. The reprovisioned subscription is then made available to the user.

According to another embodiment, a method for provisioning components of an offer is provided. An offer for a product or service is made available to the public online. One or more components of the offer are designated as non-starter components in that they are not provisioned until used for the first time. When a request is received from a user to accept the offer, all the components of the offer are made available to the user but only the components not designated as non-starter components are provisioned. When an indication is received from the user that a non-starter component is used for the first time, the non-starter component is provisioned.

The details of one or more techniques are set forth in the accompanying drawings and the description below. Other features, objects, and advantages of these techniques will be apparent from the description, drawings, and claims.

DETAILED DESCRIPTION

The present application is directed to systems and methods for managing product offers over the Internet. Offers are packages of online services that can be obtained by users and that are directed to specific markets with specific billing requirements. The package of online services is a collection of components that may include products as well as applications and services. A component is an individual feature that is packaged with other features in an offer. Offers may be purchased by customers or they may be accepted free of charge. Offers can be provisioned into subscriptions and the provisioning process can adjusted via a life-cycle management system. Provisioning refers to the instantiation (creation of system resources) for an offer. The composition and provisioning of an offer can be adjusted via a change management system.

Figure 1:
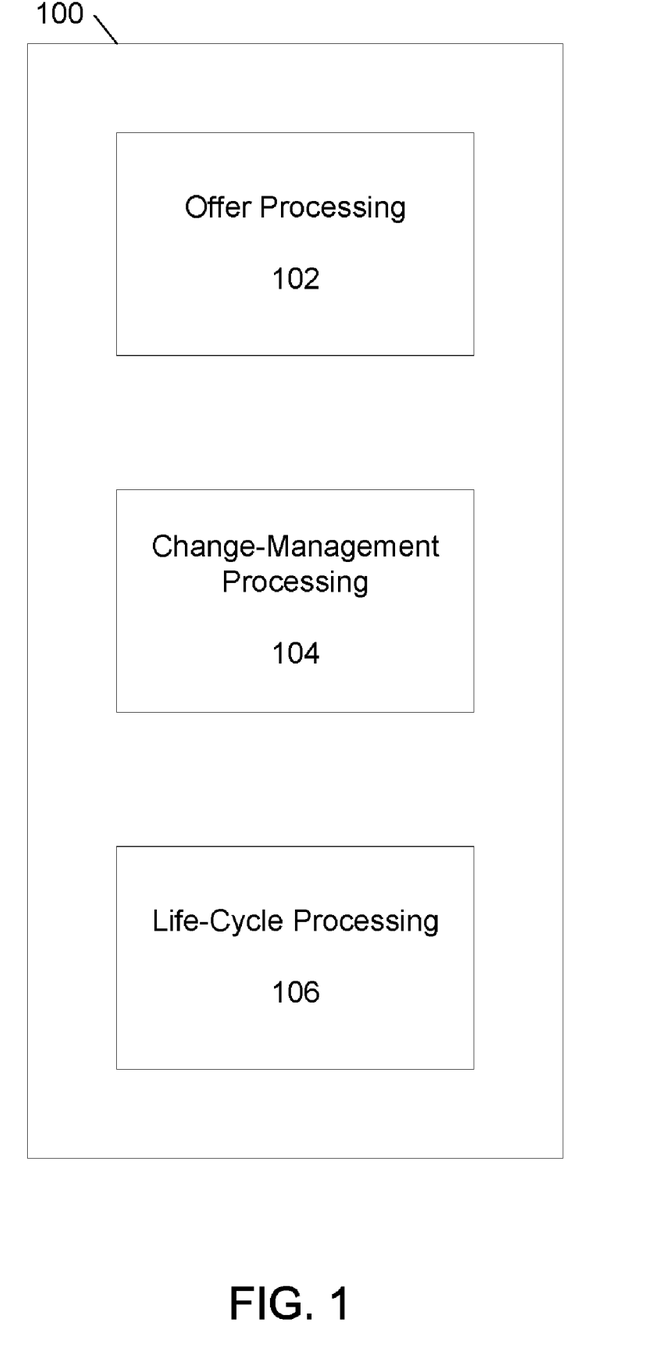
FIG. 1 shows an example system for managing online offers for products and services.

FIG. 1 shows an example offer management system 100 that comprises offer processing 102, change-management processing 104 and life-cycle processing 106. Offer processing 102 is directed to defining product components, creating offers for a collection of components that are oriented towards one or more markets with one or more billing requirements and provisioning accepted offers into subscriptions. Offer processing is also directed to renaming, resetting, enabling, disabling and deprovisioning components. Change-management processing 104 is directed to processing requests for alterations to provisioned orders and reprovisioning offers based on these requests.

Life-cycle processing 106 is directed to managing the life-cycle of an offer and a subscription. Life cycle processing of an offer includes the stages of creating an offer, modifying an offer, creating add-on offers, creating conversion paths for an offer and terminating an offer. Life cycle processing of a subscription includes instantiation of an offer to a subscription, conversion, renaming and reprovisioning of a subscription and enabling, disabling, resetting and deprovisioning the components in the subscription.

Figure 2:
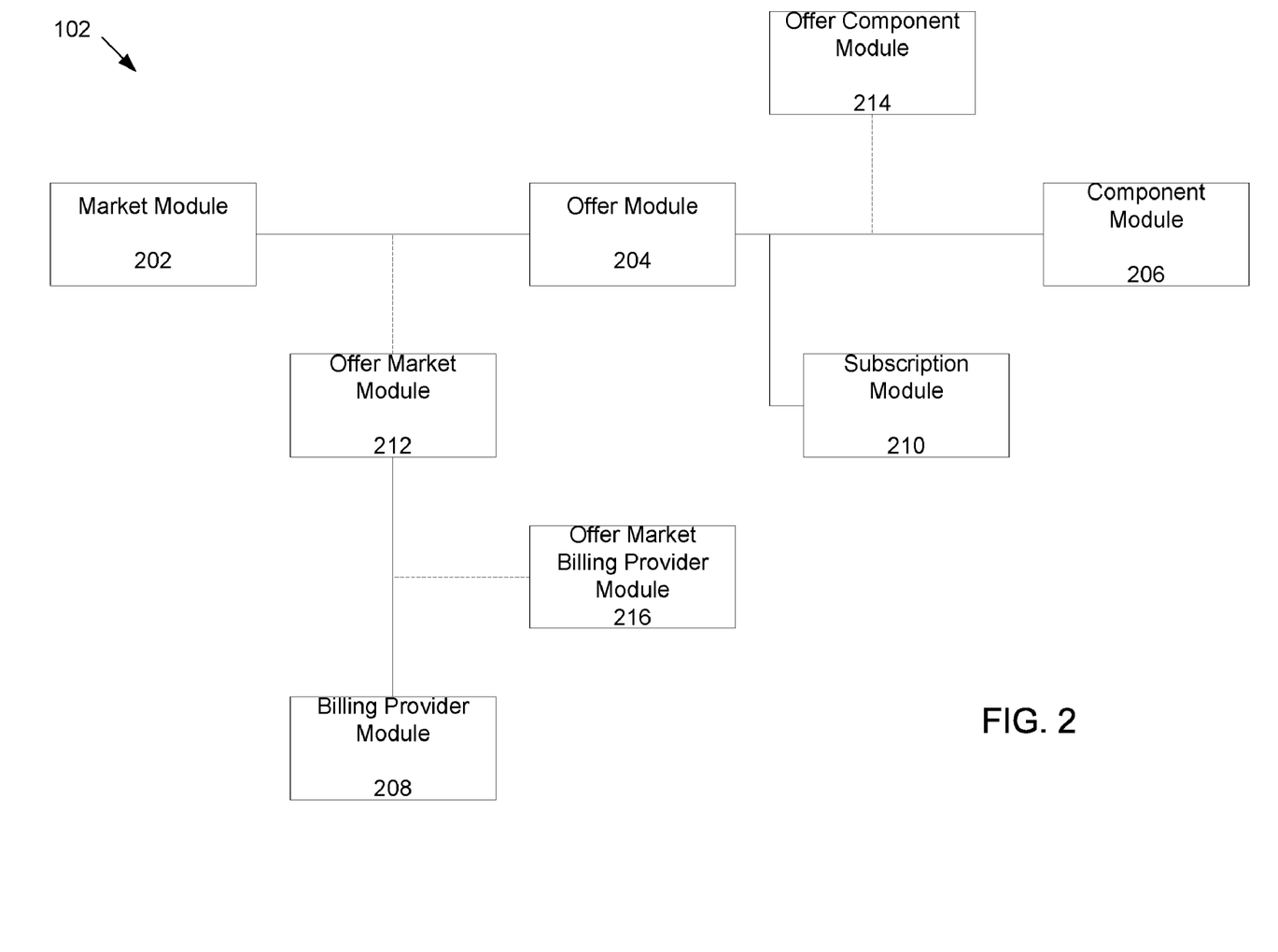
FIG. 2 shows example modules of an example online offer processing system.

FIG. 2 shows an example order processing system 102 in more detail. The example order processing system 102 comprises market module 202, offer module 204, component module 206, billing provider module 208, subscription module 210, offer market module 212, offer component module 214 and offer billing provider module 216.

The example components module 206 defines the components that may be included in an offer. A component is an individual feature that is packaged with other features in an offer. Components can include products, applications, services and placeholders for additional features. Examples of components are websites, email, word processing programs, spreadsheets, games, etc. Each component has a set of properties that define the capabilities of the component. For example, a website may have properties that include the storage capacity for the website and the bandwidth of the website. The type of component may also be defined as a property. For example, a website may be a "base" type or an "add-on" type. An example "base" type may define a set of website properties that are included in all website components. One or more example "add-on" types may define sets of properties specific to certain websites only.

The example offer component module 214 defines the mappings between offers and the components that are included in that offer. An offer consists of a subset of available components. One or more components may be included in an offer. However, a component may be part of multiple offers.

The property set of a component is specific to an offer and may vary for different offers. The same component may have different property sets in different offers. For example, a website component that is included in an example "Small Business Basics" offer may have a storage capacity type of 1 gigabyte and a bandwidth of 2500 Mbits/sec. But a website component that is included in an example "Small Business Plus" offer may have a storage capacity of 3 gigabytes and a bandwidth of 5000 Mbits/sec.

The example market module 202 defines the country or billing region in which users can sign up for offers. Example markets are the United States, Brazil, the United Kingdom, Europe, etc. Markets have specific characteristics to which offers can be tailored.

The example offer market module 212 defines the billing characteristics of an offer for each market in which the offer is made. An offer may be free to the user or it may be billed. If the offer is billed, example billing characteristics include the price, the currency used, discounts, coupons, the payment instruments (e.g. check, credit card, debit card, tokens, etc.) that may be used, the payment terms, billing cycle, cancellation terms, support level, etc. An offer may be made free for a period of months or a year before being billed. An offer may be based on usage, may be auto expiring, may use different types of payment instruments, may be token based, etc.

The example billing provider module 208 includes information for billing providers that are designated to process orders. Example billing providers processes payment instruments (for example credit cards) for offers and may also perform other payment actions such as validating payments, prorating payments and providing refunds.

The example offer market billing provider module 216 maps markets to billing providers that serve a particular market. When an offer is purchased, the user is charged according to the settings in the example offer market billing provider module 216.

The example offer module 204 defines the attributes for an offer. Example attributes may include the name of the base offer, whether there are any add-ons to the base offer, the name of such add-ons, the name of an offer that the current offer may be converted to, the name of an offer that may be converted to the present offer, etc. The example offer module 204 also provides versioning for an offer. Each offer has a version that is incremented when an offer is modified. In addition, the example offer module 204 controls how long an offer is available for signup by a user.

The example subscription module 210 lists the offers that have been accepted by a user. Offers may be may be billed or they may be free. When a user purchases or signs up for an offer in a market, the offer is provisioned to the user and the components in the offer are also provisioned. Provisioning means that the offer is activated and system resources for the offer are instantiated. A provisioned offer is called a subscription. When an offer is provisioned, the user is charged per the billing characteristics of the offer for the market in which the offer is made.

In certain cases a user may not need all the components of an offer initially and may not want to pay for components that are not being used. In this case, certain components are designated as non-starter components. A non-starter component is not provisioned until first-use by the user. If the component is billable, the user is not billed for the component until it is provisioned. This constitutes just-in-time (JIT) provisioning of an offer. Another benefit of JIT provisioning is more efficient use of system resources. Storage and computing resources are only allocated upon first-use by the user.

Once an offer is provisioned, a user may still want to make changes to the offer. For example, at a later time, the user may wish to add additional storage to a website. The example change management processing module 104 provides add-on components for purchase by users and then collapses these add-on components into the properties of an offer. The offer may then be reprovisioned to provide the additional storage. This is illustrated in FIGS. 3 and 4 as discussed below.

Figure 3:
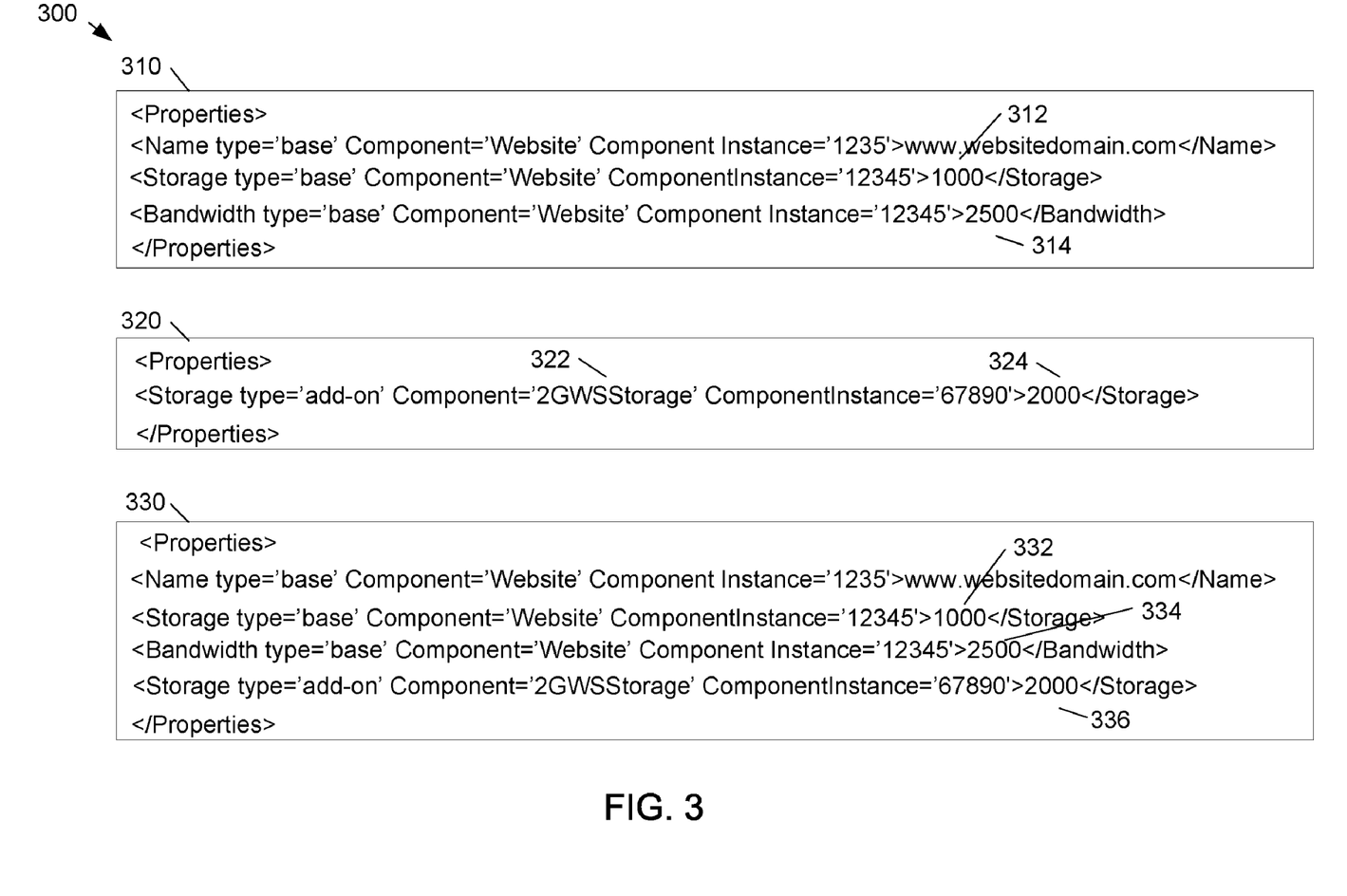
FIG. 3 shows example properties of example components used in an online offer processing system.

FIG. 3 shows example properties of example components 300 used in an example offer that is reprovisioned. Example component 310 is a base website component having a storage capacity 312 of 1000 megabytes and a bandwidth 314 of 2500 Mbits/sec. Example component 320 is an add-on component with an example name 322 of 2GWSStorage and storage capacity of 2000 megabytes.

Example base website component 310 is included as a component of an example Small Business Basics offer. When this offer is provisioned, the user of the Small Business Basics offer will have 1000 megabytes of storage. If at a later time, the user wanted to add more memory, the user could purchase an example Extra Website Storage 2G add-on offer with a storage capacity of 2000 megabytes. When the example Extra Website Storage 2G offer is provisioned, the example base website component 310 is reprovisioned by inserting the property sets of the add-on component into the property set of the base component, effectively giving the combined component 3000 megabytes of storage. Item 330 in FIG. 3 shows the properties of the combined component including 1000 megabytes of storage 332 for the base website component, a bandwidth 334 of 2500 Mbits/sec for the base website component and 2000 megabytes of storage 336 for the add-on website component.

Figure 4:
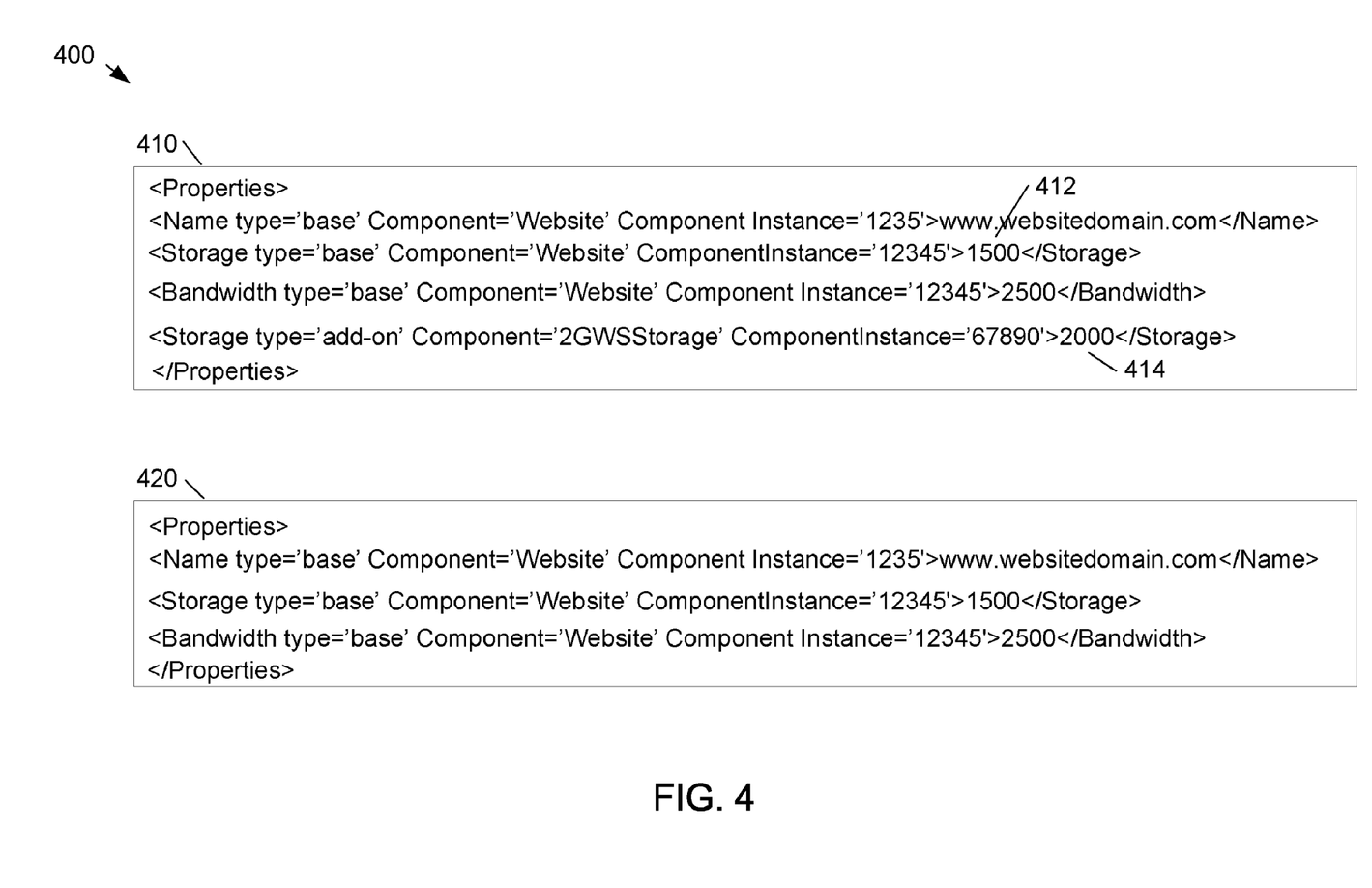
FIG. 4 shows example properties of example components that are modified as a result of reprovisioning an offer.

FIG. 4 shows the properties of components 400 when additional changes are made to a provisioned component. For example, a decision may be made (for example in response to competition) to raise the base website storage for all users from 1000 megabytes to 1500 megabytes. In this example, the website of the above user is reprovisioned with the property set 410 to give the user a total storage of 3500 megabytes. The storage capacity 412 of the base component is reprovisioned to 1500 megabytes and the storage capacity 414 of the add-on component remains at 2000 megabytes, for a total of 3500 megabytes.

As another example, if the user subsequently decides to cancel the add-on website storage, the user's website is reprovisioned to remove the add-on website storage but to keep the remaining properties intact, effectively reducing the storage capacity to 1500 megabytes. The example property set 420 shows the add-on component removed.

Reprovisioning provides flexibility for different user situations. For example, sometimes a website provider would like to give a user free additional storage. This may be for a promotion or for a customer award, etc. Rather than give the user an add-on component which may have billing implications, the website provider could reprovision the base website component for the increased storage. This would provide the user with the additional storage without billing the user for it.

The example change management processing module 104 also permits changes to be applied to all users of a provisioned offer simply by changing a property of that offer. For example, if a base offer provides 1 gigabyte of storage and that base offer is to be upgraded to 1.5 gigabytes of storage, all users of that offer who had been provisioned for 1 gigabyte can be upgraded to 1.5 gigabytes simply by changing a storage property to 1.5 gigabytes. In this manner, users can be quickly upgraded in a batch fashion. However, the existing users are not upgraded until change management is run. This provides the flexibility to provide new users with upgraded features and not upgrade existing users until a decision is made to run change management. Change management can be used for a variety of changes including adding new components, upgrading components from beta to non-beta, changing components from paid to free, discontinuing components, etc. Other uses of change management are possible.

The online services offer management system discussed above also provides life cycle data flow to provide additional offer options to a user. With life cycle data flow, an offer can have properties independent of the features of the offer. So for example, an offer can be created and can be beta tested before being made available to the public. An offer may be designated as a trial offer, wherein, for example, a user is offered a discount to try the offer for a period of time and then pay the full price if the user decides to keep the offer. An offer may be wait listed so that a user doesn't get the functionality of the offer for a defined period of time. An offer may be put on hold or it may be disabled for policy violations. In addition, an offer may be designated as active when it is made available to the public and designated inactive when it is no longer available. In addition, the components of an offer may be renamed, for example to change the name of a website or a component may be removed from an offer by deprovisioning it. Some components may be reset, for example by resetting the password of an email component. Other uses of life cycle data flow are possible.

Through reprovisioning, change management and life cycle data flow, the online services offer management system provides several benefits. It provides a high degree of business model flexibility as the business evolves, without having to reprogram individual applications when business needs change. In addition, the online services offer management system also permits customized solutions to be provided to individual customers that can be oriented to specific markets and specific billing cycles.

Figure 5:
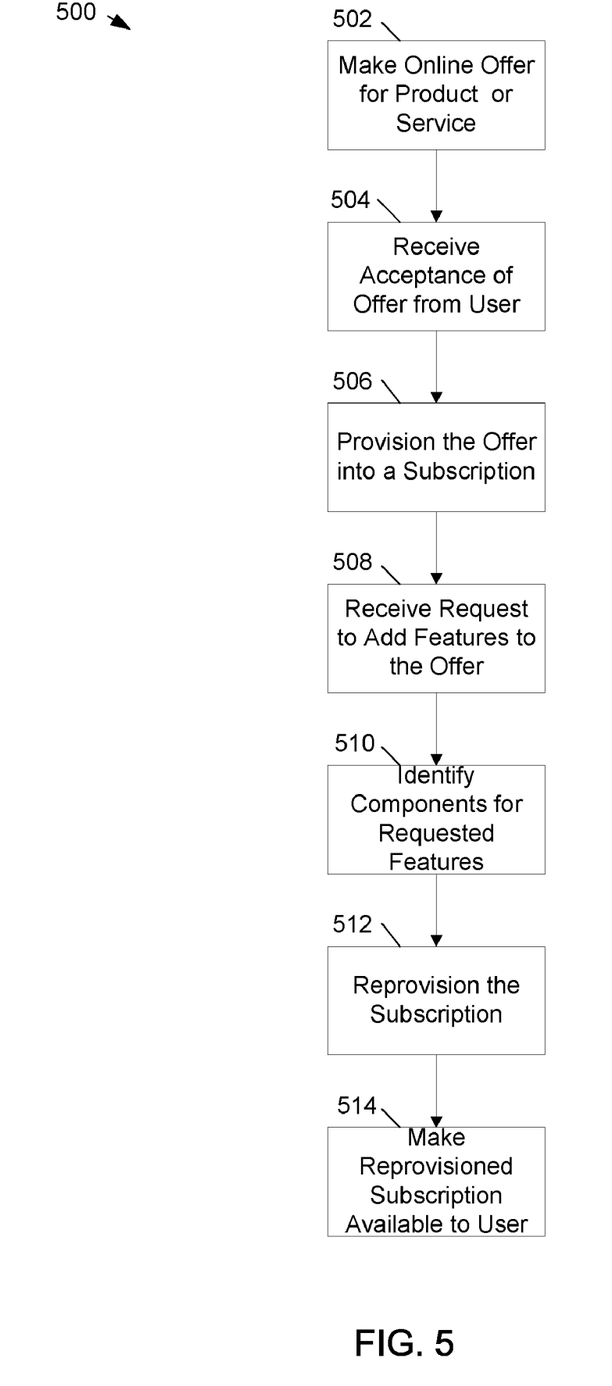
FIG. 5 shows a flowchart for a method for providing online offers for services and products.

FIG. 5 is a flow chart showing an example method for providing online offers to users. At operation 502, an offer for a product or service is made available to the public online. The offer typically includes one or more base components and is typically made available in more than one market. At operation 504 an indication is received that a user has accepted the offer. Typically, the user clicks on a website control that represents accepting or purchasing the offer. Other methods of acceptance are possible.

At operation 506, the offer is provisioned into a subscription. Provisioning instantiates the components included in the offer so that memory and other system resources are allocated for them. If the offer is a billed order, provisioning instantiates a billing cycle for the order. The subscription may also include provisions for changing the terms of an offer, such as converting a trial offer into a fully-billed offer.

At operation 508, a request is received to add features to an offer. For example, a user may wish to upgrade a provisioned offer for a website to add email or to increase storage capacity on the website. At operation 510, components are identified that can implement the features requested. For example, components for email or for an increased amount of storage are identified.

At operation 512, the subscription is reprovisioned by adding the properties of the identified components to the properties of the base components in the offer. For example, if the offer is for a website, the properties of a component for additional storage are inserted into the properties of a base storage component. At operation 514, the reprovisioned subscription is made available to the user.

Figure 6:
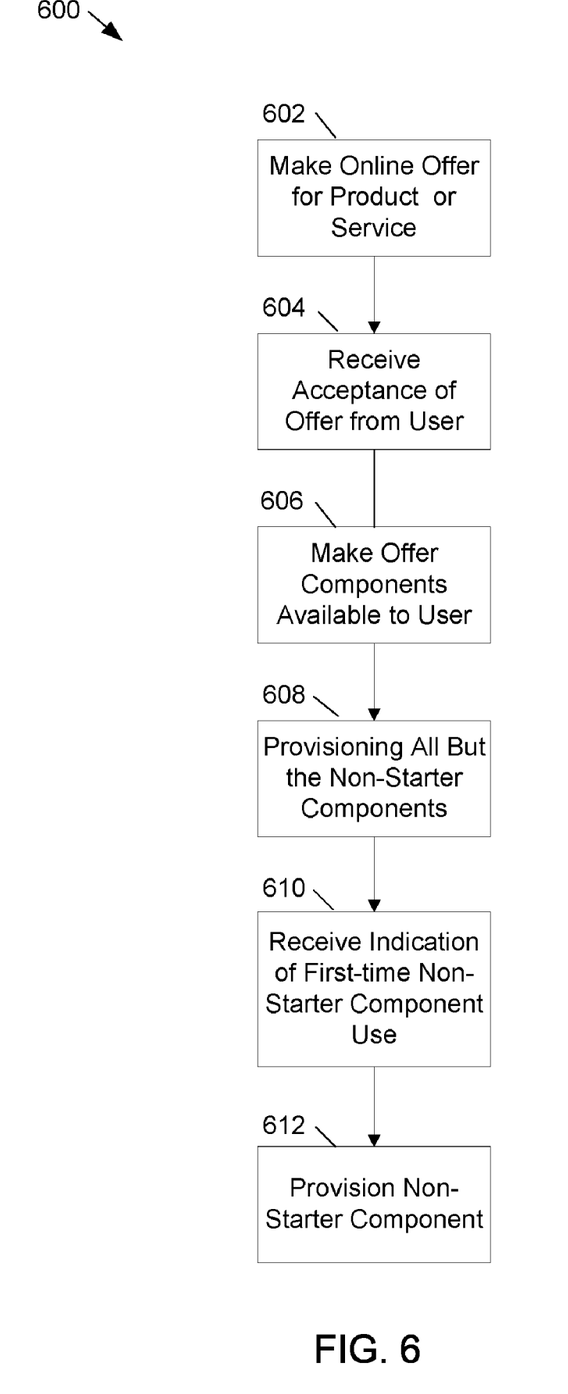
FIG. 6 shows a flowchart for a method of just-in-time provisioning of an offer.

FIG. 6 is a flow chart showing an example method for just-in-time provisioning of an offer. At operation 602, an offer for a product or service is made available to the public online. The offer includes one more components and of these components one or more are designated as non-starter components. Non-starter components are components that are not provisioned until they are actually used. At operation 604, an indication is received that a user has accepted the offer. At operation 606, the components of the offer are made available to the user. All components except the non-starter components are provisioned at operation 608. At operation 610, an indication is received that a non-starter component is used for the first time. At operation 612, the non-starter component is provisioned.

Figure 7:
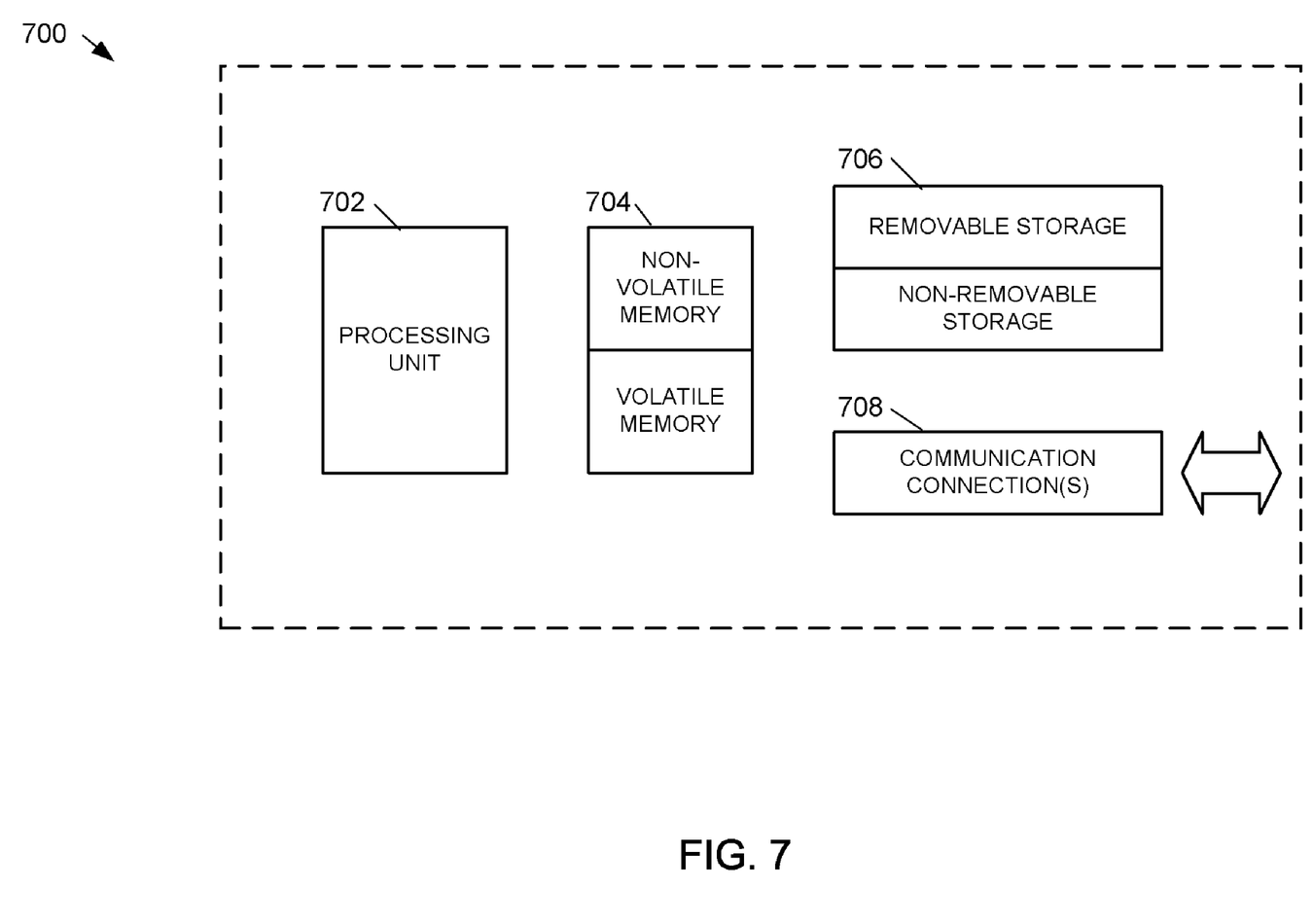
FIG. 7 shows an example computer architecture for a server that may be used in an online services offer system.

FIG. 7 is an example computer architecture for a server 700 that may be used in an online services offer system. The server 700 is a computer system including a processing unit 702 and computer readable media 704. Computer readable media 704 can include memory such as volatile (such as RAM), non-volatile (such as ROM, flash memory, etc.) or some combination thereof. Additionally, the server 700 can include mass storage 706 (removable and/or non-removable) such as a magnetic or optical disks or tape. An operating system and one or more application programs can be stored on the mass storage device. The server 700 includes communication connections 708 and can communicate with client computers through one or more networks, such as a local area network (LAN), a wide area network (WAN), the Internet, or a combination thereof. Communications can be implemented using wired and/or wireless technologies.

The various embodiments described above are provided by way of illustration only and should not be construed to limiting. Various modifications and changes that may be made to the embodiments described above without departing from the true spirit and scope of the disclosure.

What is claimed is:

1. A computer system for managing online offers for products and services, the system comprising:
   a processing unit operative to execute:
      a components module that includes one or more components that may be included in an offer, a component including properties that define capabilities of the component, a component being either a base component that is included in a base offer or an add-on component that is included in a reprovisioned offer;

an offer module that defines features of the offer, the offer including one or more components;

a subscription module that processes provisioning of an offer, the provisioning of the offer comprising:
activating the offer;
instantiating the one or more components included in the offer; and
allocating memory and other system resources in the computer system for the instantiated one or more components only upon a first-use of the one or more components by a user to constitute just-in-time (JIT) provisioning of the offer, the one or more components comprising a billable component which is not initially needed for the offer, the user not being billed for the billable component until the billable component is provisioned;

a market module that specifies countries or billing regions in which offers are made available;

a billing provider module that processes billing and payment actions for an offer; and a change management processing module that processes alterations to a provisioned offer, the change management module inserting the properties of the add-on component into the properties of a base component, the base component properties including all of a plurality of components in a group, the group comprising at least one of websites, emails, word processing programs, spreadsheets and games, the add-on component properties being only specific to at least one of certain components in the group.

2. The system of claim 1, wherein the offer module further defines offers by type, wherein the type may define a base offer or an add-on offer.

3. The system of claim 1, wherein the subscription module provisions the offer when the user purchases or signs up for an offer.

4. The system of claim 1, wherein the subscription module may reprovision an offer that has been provisioned.

5. The system of claim 1, wherein the processing unit is further operative to execute an offer market module that adjusts offers based on a market in which the offer is made.

6. The system of claim 5, wherein the offer market module makes an offer available in a plurality of markets.

7. The system of claim 5, wherein the offer market module makes offers available in either free or billed form.

8. The system of claim 5, wherein the offer market module makes offers available from a group consisting of trial offers, offers that are free for one or more months, offers that are free for a year, discounted offers, usage based offers and auto expiring offers.

9. The system of claim 1, wherein the processing unit is further operative to execute an offer component module that defines a mapping between an offer and the components comprising the offer.

10. The system of claim 1, wherein the processing unit is further operative to execute an offer market billing provider module that associates a billing provider with a market.

11. The system of claim 10 wherein, when an offer is purchased, the user is charged according to billing characteristics set in the offer market billing provider module.

12. The system of claim 1, wherein the processing unit is further operative to execute a life cycle processing module that manages a creation and provisioning of an offer.

13. The system of claim 12, wherein the life cycle processing module determines when an offer is made available to the public.

14. The system of claim 12, wherein the life cycle processing module assigns and manages discounts for offers.

15. The system of claim 12, wherein the life cycle processing module determines when an offer expires.

16. A method for managing online offers for products and services, the method comprising:
making, by a computer system comprising a processing unit, an offer for an online product or service available to the public, the offer comprising one or more base components, the offer made available in one or more markets;
receiving, by the computer system an indication that a first user has accepted the offer;
provisioning, by the computer system, the offer into a subscription for the first user, the provisioning of the offer comprising:
activating the offer;
instantiating the one or more base components; and
allocating memory and other system resources in the computer system for the instantiated one or more base components only upon a first-use of the one or more components by the first user to constitute just-in-time (JIT) provisioning of the offer, the one or more components comprising a billable component which is not initially needed for the offer, the first user not being billed for the billable component until the billable component is provisioned;
receiving, by the computer system, a request from a second user to add features to the offer;
identifying, by the computer system, components that can implement the features requested;
reprovisioning, by the computer system, the subscription by inserting properties of the identified components into the properties of one or more base components;
making, by the computer system, the reprovisioned subscription available to the second user;
wherein the first user and the second user are the same.

17. The method of claim 16, wherein a billing provider is associated with a market.

18. The method of claim 17, wherein the same billing provider is used in more than one market.

19. The method of claim 17, wherein the billing provider is selected from a plurality of available billing providers, each billing provider from the plurality of billing providers being authorized to bill the user.

20. A method for provisioning components of an offer, the method comprising:
making, by a computer system comprising a processing unit, an offer for an online product or service available to the public, the offer comprising one or more components, the offer including one or more components designated as non-starter components;
receiving, by the computer system, a request from a user to accept the offer;
making, by the computer system the one or more components of the offer available to the user;
provisioning, by the computer system, all components except the non-starter components, the provisioning of all components except the non-starter components comprising:
activating the offer;
instantiating the one or more components which do not comprise the non-starter components; and
allocating memory and other system resources in the computer system for the instantiated one or more components which do not comprise the non-starter components;

receiving, by the computer system, an indication from the user when a non-starter component is used for the first time; and provisioning, by the computer system, the non-starter component when said indication from the user is received, the provisioning of the non-starter component comprising allocating memory and other system resources in the computer system for the non-starter component only upon a first-use of the non-starter component by the user to constitute just-in-time (JIT) provisioning of the offer, the non-starter component comprising a billable component which is not initially needed for the offer, the user not being billed for the billable component until the billable component is provisioned.

* * * * *